April 15, 1930.  W. O. FROHRING ET AL  1,754,941
SPRAY DRIER
Filed April 20, 1927   2 Sheets-Sheet 1

Inventors
William O. Frohring
William F. Richards
By Birckitt & Hyde
Attorneys

April 15, 1930.  W. O. FROHRING ET AL  1,754,941

SPRAY DRIER

Filed April 20, 1927  2 Sheets-Sheet 2

Inventors
William O. Frohring
William F. Richards
By Birkett & Hyde
Attorneys

Patented Apr. 15, 1930

1,754,941

UNITED STATES PATENT OFFICE

WILLIAM O. FROHRING, OF SHAKER HEIGHTS, OHIO, AND WILLIAM F. RICHARDS, OF MASON, MICHIGAN, ASSIGNORS, BY MESNE ASSIGNMENTS, TO THE LABORATORY PRODUCTS COMPANY, OF CLEVELAND, OHIO, A CORPORATION OF OHIO

SPRAY DRIER

Application filed April 20, 1927. Serial No. 185,303.

This invention relates to spray driers, such as are used for drying food products and particularly milk products, for example curd, alkaline caseinates, milk sugar and the like.

The object of the invention is to provide an improved spray drier which can be operated continuously with a continuous removal of the dried material as it is formed, doing away with any necessity of stopping operation to enter the drying chamber and remove the material, avoiding contamination of the material by necessity of walking over it to remove it and at the same time retaining all of the advantages of the circular form of such driers.

Further objects of the invention are in part obvious and in part will appear more in detail hereinafter.

Figure 1:
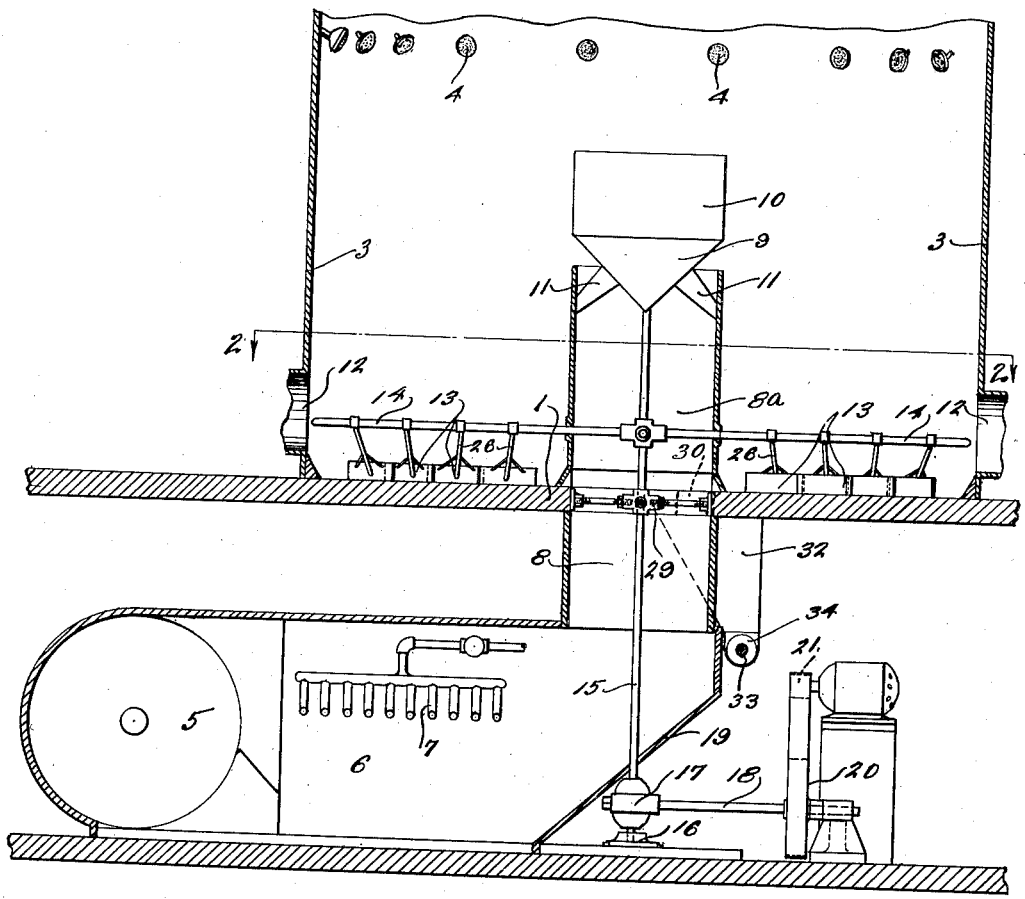
Figure 5:
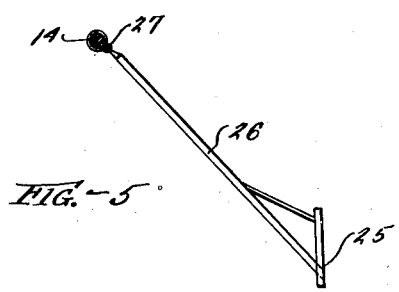
Figure 2:
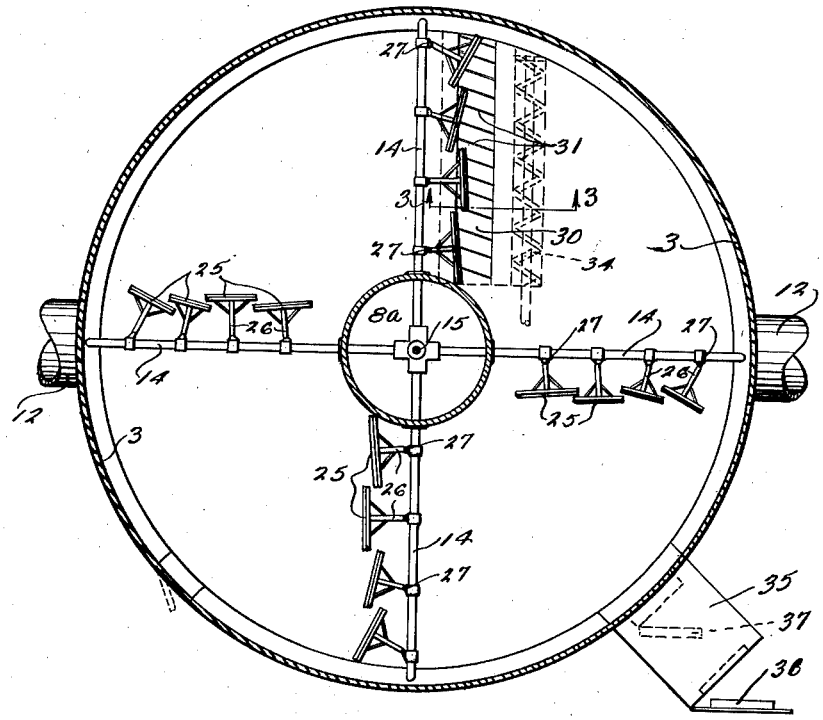
Figures 3, 4:
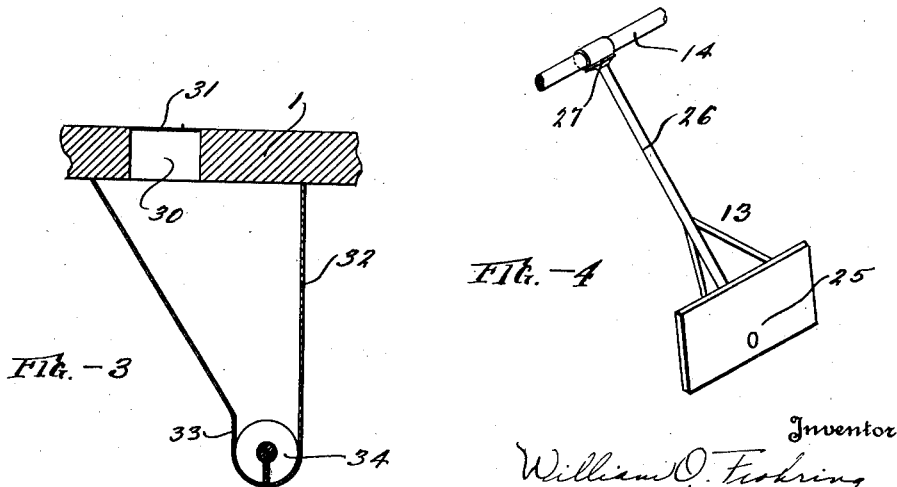

In the drawings, Fig. 1 represents somewhat diagrammatically a central elevation through one form of spray drier embodying the invention; Fig. 2 is a sectional plan view on the line 2—2, Fig. 1; Fig. 3 is a detail cross section on the line 3—3, Fig. 2; and Figs. 4 and 5 are detail views illustrating the scrapers.

The spray drier shown in the drawings comprises the necessary floor 1, a ceiling and circular side wall 3 to form a large cylindrical chamber with its axis vertical, such chambers usually being 25 to 30 feet in diameter, the walls and floor being usually lined with sheet metal to provide a smooth surface readily cleaned. Into said chamber the material to be dried, such as a solution of milk sugar, an alkaline caseinate or the like, is introduced at elevated points through one or a plurality of spray nozzles 4 distributed at intervals around the upper portion of the chamber. As the spray falls it meets a current of hot air, which in the present drier is introduced from beneath the floor 1 and along the line of the axis of the chamber. As shown, the air supply, properly washed and cleaned where necessary, is introduced by a fan or blower 5 into a chamber 6 in which are steam heating coils 7. From said chamber the air flows to a conduit 8 coaxial with the chamber, the portion of said conduit below the floor 1 being stationary and the portion above the floor, marked $8^a$, being rotatable, as will appear. Supported by said rotatable conduit $8^a$ and placed above the same is a deflector including a conical lower portion 9 and a cylindrical upper portion 10, said deflector being supported by the braces 11 from the conduit $8^a$. The annular space between the cone and the upper edge of the conduit $8^a$ causes the air moving upwardly through the conduit to be distributed about the chamber, through which it flows to one or more, two being shown, of outlets 12, beyond which the air flows through conduits to dust collectors for recovering the last traces of solid material which might otherwise be blown to the outer atmosphere.

In the operation of this drier the material being dried falls in a dry state to the floor and is usually removed by shutting off the air current and allowing the drier to cool down and then entering the chamber and shoveling out the material. According to the present invention we provide means for continuously removing the material as it is deposited, which means, in the form shown, includes a series of scrapers traveling in circular paths about the chamber and scraping the solid material from its floor and carrying it to a slot or opening through which it falls into a suitable receptacle from which it may be conveyed outwardly to any desirable point. The scrapers 13 shown for the purpose are something like hoes, a plurality thereof being attached to each of a series, four being shown, of radial arms 14 passing through the wall of the conduit $8^a$ and attached to a central vertical shaft 15 mounted at its bottom in a step bearing 16 and provided with suitable speed reducing gearing connections, generally indicated at 17, to a shaft 18, the step bearing, gearing, and shaft all being located outside of a wall 19 of the air conduit and thereby conveniently accessible for adjustment or control. Shaft 18 at its outer end is provided with a belt pulley 20 from which a belt passes to a pulley 21 driven by any suitable source, as from an electric motor.

The scrapers 13 may be pulled around by their arms 14, just as in the case of a hoe, but better results are obtained by pushing them around in advance of the arms, which produces more or less of a plowing effect and tends to more completely clean the floor surface of the deposit thereon. Each scraper has a scraping blade 25 attached to its rod 26, the several rods 26 being hinged at 27 to their arms 14, and, of course, the scraping blades on successive arms are in staggered relation to each other so that the whole series of scrapers works upon every square inch of the deposit receiving surface. Shaft 15 may be steadied by a suitable bearing 29 if desired.

To remove the material the floor of the chamber is provided with a slot or opening 30, which is a long narrow channel extending generally radially but preferably at a slight angle to a true radius so that as the several scrapers pass over this channel they are inclined to the length thereof and each scraper is of such length that its advancing end will pass over the channel and reach the opposite edge before its trailing end leaves the first edge of the channel. As a result the scrapers do not drop into the channel. To further provide support for the scrapers while passing over the channel, a series of wires or small rods 31 may be bridged across the top of the channel at the floor level to provide support for the scrapers. Channel 30 lies above a hopper 32 with sloping side walls and a trough shaped bottom 33 in which is a constantly rotating screw conveyor 34 driven from any suitable power source. With the arrangement described while the material to be dried in liquid form is being sprayed into the chamber and an air current passed therethrough, the rotating frame is constantly turned at slow speed to move the several scrapers around the floor, scraping off the deposit therefrom and pushing it into the channel from which the screw conveyor carries it outward and deposits it in a suitable container. Of course, during the operation of such spray driers the deposit may be more or less slow in forming so that under some circumstances it is unnecessary to operate the scraping mechanism continuously but its operation, for example, for periods of two or three minutes at intervals of fifteen minutes or an hour will be sufficient to remove the material and prevent too thick a deposit thereof and in this sense such operation may be considered continuous because it never requires the drying operation to be stopped, such as by shutting off the supplies of air and liquid to be dried to the drier and permitting the latter to cool down.

For repair and other purposes the drier, as usual, may be provided with a suitable entrance for the workmen, such as a small chambered annex 35 provided with outer and inner doors 36, 37, enabling the workmen to enter and leave the chamber without shutting down its operation.

One important advantage of the invention is the fact that the operating mechanism has been so designed and arranged as to avoid contamination of the food product by greased or oiled bearings and by the location in the current of hot air of only such parts as will operate satisfactorily and properly without constant attention. The motor, belt drive and speed reducing gearing are all located outside of the air current. The bearing 29 does not need to be a lubricated bearing but merely a steadying guide because the shaft 15 is strong enough to support all parts and the rotating frame is symmetrical with very little tendency to sway laterally. The several hoes are provided with simple hinge connections of their rigid handles to the radiating arms 14 and none of the parts within the drying chamber and contacting with the food product require lubrication.

What we claim is:

1. A spray drier, comprising a cylindrical chamber with its axis vertical, air supply means therefor including a conduit extending upwardly from the chamber floor at its center, and rotatable means supporting said conduit and provided with scraping means traveling about the chamber axis.

2. A spray drier, comprising a circular drying chamber, said chamber being provided with a substantially radially extending channel in its bottom, movable means within said chamber for scraping the material deposited on the chamber bottom and for conveying it to said channel, and supporting means extending across said channel for supporting the scraping means while crossing said channel.

3. A spray drier, comprising a cylindrical chamber with its axis vertical, air supply means therefor including a conduit extending upwardly from the chamber floor at its center, rotatable means supporting said conduit and provided with scraping means traveling about the chamber axis, and a baffle for the air current located above said conduit and supported thereby and rotatable therewith.

4. A spray drier, comprising a circular drying chamber, said chamber being provided with a substantially radially extending channel in its bottom, movable means within said chamber for scraping the material deposited on the chamber bottom and for conveying it to said channel, supporting means extending across said channel for supporting the scraping means while crossing said channel, and conveying means exposed to said chamber and lying within said channel for moving the material along the same.

5. A spray drier, comprising a cylindrical chamber having a floor provided with a radially extending channel, supporting means rotatable on the axis of said chamber and provided with floor scraping means movable in a circular path about said axis and arranged to collect the material and deliver the same to said channel, and an air supply conduit extending upwardly through the floor into the chamber and having a portion rotatable with said supporting means.

In testimony whereof we hereby affix our signatures.

WILLIAM O. FROHRING.
WILLIAM F. RICHARDS.